United States Patent
Lu et al.

(10) Patent No.: US 9,882,403 B2
(45) Date of Patent: Jan. 30, 2018

(54) BATTERY MODULE

(71) Applicant: HTC Corporation, Taoyuan County (TW)

(72) Inventors: Ming-Chu Lu, Taoyuan County (TW); Tzu-Hsun Tung, Taoyuan County (TW); Chih-Chung Teng, Taoyuan County (TW); Shu-Feng Lin, Taoyuan County (TW); Yung-Ling Chou, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 395 days.

(21) Appl. No.: 13/684,250

(22) Filed: Nov. 23, 2012

(65) Prior Publication Data
US 2014/0145506 A1    May 29, 2014

(51) Int. Cl.
*H02J 7/00*    (2006.01)

(52) U.S. Cl.
CPC .......... *H02J 7/0029* (2013.01); *H02J 7/0054* (2013.01); *H02J 2007/0039* (2013.01); *Y10T 307/625* (2015.04)

(58) Field of Classification Search
CPC .... H02J 9/062; H02J 9/061; H02J 9/06; H02J 7/34; H02J 7/163; H02J 7/0093;
(Continued)

(56) References Cited

U.S. PATENT DOCUMENTS

| | | | | | |
|---|---|---|---|---|---|
| 4,751,150 | A | * | 6/1988 | Oogita | H01M 2/34 429/1 |
| 7,948,212 | B2 | * | 5/2011 | Odaohhara | H02J 7/047 320/128 |

(Continued)

FOREIGN PATENT DOCUMENTS

| CN | 1049249 | 2/1991 |
|---|---|---|
| CN | 101295879 | 10/2008 |

(Continued)

OTHER PUBLICATIONS

"Office Action of Taiwan Counterpart Application", dated Jul. 17, 2014, p. 1-p. 7.

(Continued)

*Primary Examiner* — Thienvu Tran
*Assistant Examiner* — Brian K Baxter
(74) *Attorney, Agent, or Firm* — JCIPRNET

(57) ABSTRACT

A battery module including a connection terminal, a first battery, a second battery and a current limiting circuit is provided. The connection terminal serves as a power input terminal of the battery module during the charging of the battery module, and serves as a power output terminal of the battery module during the discharging of the battery module. The first battery is coupled to the connection terminal, and serves as a primary power source of a mobile device. The second battery serves as an auxiliary power source of the mobile device. The current limiting circuit is coupled between the second battery and the connection terminal, and restricts the magnitudes of the currents flowing into and out of the second battery according to a charging current threshold and a discharging current threshold.

9 Claims, 3 Drawing Sheets

(58) Field of Classification Search
CPC ........ H02J 7/0075; H02J 7/0091; H02J 7/245;
H02J 7/166; H02J 7/244; H02J 7/20;
H02J 7/1423; H02J 7/22; H02J 7/045;
H02J 7/0047; G06F 1/30; H02P 9/00;
H02P 9/32; H02P 9/305; Y02T 10/92;
Y02T 10/7005; H01M 10/44; H01M
10/486; H01M 10/5004; Y02E 60/122;
Y02E 60/12; G01R 31/3648; G01R
19/16542; G01R 31/3624
USPC .......... 307/66; 320/117, 118, 136, 129, 123,
320/150, DIG. 21; 322/88, 28
See application file for complete search history.

(56) References Cited

U.S. PATENT DOCUMENTS

| | | | | |
|---|---|---|---|---|
| 8,410,749 | B2* | 4/2013 | Oto | H01M 10/44 |
| | | | | 320/101 |
| 8,847,552 | B2* | 9/2014 | Ro | H01M 10/425 |
| | | | | 320/125 |
| 2008/0048621 | A1* | 2/2008 | Yun | H02J 7/0004 |
| | | | | 320/136 |
| 2008/0290833 | A1* | 11/2008 | Hayashi | H01M 10/4257 |
| | | | | 320/106 |
| 2008/0290835 | A1* | 11/2008 | Hayashi | H01M 2/1022 |
| | | | | 320/112 |
| 2010/0121252 | A1* | 5/2010 | Keltner et al. | 604/20 |
| 2010/0134305 | A1* | 6/2010 | Lu | H02J 7/0021 |
| | | | | 340/636.13 |
| 2010/0214707 | A1* | 8/2010 | Yun | 361/92 |
| 2011/0307733 | A1* | 12/2011 | Tokunaga | H02J 9/061 |
| | | | | 713/340 |
| 2012/0019193 | A1* | 1/2012 | Yu | G06F 1/266 |
| | | | | 320/103 |
| 2012/0131367 | A1* | 5/2012 | Kamijima | H02J 7/0021 |
| | | | | 713/323 |
| 2013/0057221 | A1* | 3/2013 | Shibata | H02J 7/0029 |
| | | | | 320/134 |
| 2013/0110430 | A1* | 5/2013 | Nishi et al. | 702/63 |
| 2013/0154371 | A1* | 6/2013 | Ju | 307/31 |
| 2013/0293020 | A1* | 11/2013 | Shim | 307/72 |
| 2013/0335034 | A1* | 12/2013 | Suzuki | H01M 4/525 |
| | | | | 320/160 |

FOREIGN PATENT DOCUMENTS

| | | |
|---|---|---|
| CN | 201656501 U | 11/2010 |
| CN | 102117944 | 7/2011 |
| CN | 201918748 U | 8/2011 |
| CN | 102780242 | 11/2012 |
| TW | 200922072 | 5/2009 |
| TW | 201108555 | 3/2011 |
| TW | 201110504 | 3/2011 |
| TW | 201225479 | 6/2012 |

OTHER PUBLICATIONS

"Office Action of Taiwan Counterpart Application", dated Nov. 24, 2014, p. 1-p. 5.
"Office Action of China Counterpart Application," dated Jul. 30, 2015, p. 1-p. 9.

* cited by examiner

BATTERY MODULE

TECHNICAL FIELD

The invention relates to a battery module, and more particularly, to a battery module capable of effectively utilizing two batteries with different charging/discharging abilities simultaneously to enhance the overall capacity.

BACKGROUND

Light, slim and compactable mobile devices have gradually been favoured by consumers, along with the advancement of science and technology. To be used conveniently, a mobile device is usually equipped with a battery module, in order for the user to operate the mobile device through supplying power from the battery module under the condition that no external power supply is available.

Nowadays, for mainstream battery applications, most mobile devices such as a mobile phone, a tablet PC or a notebook computer are used lithium batteries as the power sources. Although the lithium battery has a high energy density, the lithium battery still occupies the largest portion within the mobile device, as compared with other components of the mobile device.

Thus, in consideration of product dimension, the capacity of the battery module for the lithium-based battery will be limited due to dimension, so that the mobile device can not be used over a long period of time. If the consideration is based on the usage time of the mobile device and the larger lithium battery is thus applied, the dimension of the mobile device will be difficult to reduce and such device fails to meet the consumer needs.

Among the new generation of batteries, a paper battery is capable of compensating the drawback that the volume of the mobile device is largely occupied by the lithium battery. More specifically, the paper battery is flexible, bendable and puncturable, so that the disposition thereof can be more flexible and further altered within the mobile device, thereby reducing the overall dimension of the mobile device.

However, the energy density of the paper battery is still lower than that of the mainstream lithium battery, and the paper battery can not merely be used as the primary power source of the mobile device. Additionally, there is a significant difference between the charging/discharging abilities of the paper battery and the lithium battery. If the conventional mean (i.e., connecting in parallel) is applied to connect the lithium battery and the paper battery to enhance the overall capacity of the battery module, the paper battery will be damaged, and the damages can even be caused on the mobile device.

SUMMARY

Accordingly, the invention is directed to a battery module that may effectively utilize a lithium battery and a paper battery simultaneously to be the power sources of a mobile device, so as to extend the usage time of the mobile device without increasing the volume of the mobile device.

The invention provides a battery module including a connection terminal, a first battery, a second battery and a current limiting circuit. The connection terminal serves as a power input terminal of the battery module during charging of the battery module, and serves as a power output terminal of the battery module during discharging of the battery module. The first battery is coupled to the connection terminal, and serves as a primary power source of a mobile device. The second battery serves as an auxiliary power source of the mobile device. The current limiting circuit is coupled between the second battery and the connection terminal, and restricts the magnitudes of the currents flowing into and out of the second battery according to a charging current threshold and a discharging current threshold.

According to an embodiment of the invention, the current limiting circuit includes a first current limiting unit. The first current limiting unit is coupled between the second battery and the connection terminal, and restricts the magnitude of the current flowing into the second battery not to exceed the charging current threshold during charging of the battery module.

According to an embodiment of the invention, the current limiting circuit includes a second current limiting unit. The second current limiting unit is coupled between the second battery and the connection terminal, and restricts the magnitude of the current flowing out of the second battery not to exceed the discharging current threshold during discharging of the battery module.

According to an embodiment of the invention, the first battery and the second battery are connected in parallel with each other.

According to an embodiment of the invention, an energy density of the first battery is greater than an energy density of the second battery.

According to an embodiment of the invention, the second battery is a paper battery.

The invention provides a battery module including a connection terminal, a first battery, a second battery, a current limiting circuit and a current limiting controller. The connection terminal serves as a power input terminal of the battery module during charging of the battery module, and serves as a power output terminal of the battery module during discharging of the battery module. The first battery is coupled to the connection terminal, and serves as a primary power source of a mobile device. The second battery serves as an auxiliary power source of the mobile device. The current limiting circuit is coupled between the second battery and the connection terminal, and restricts the magnitudes of the currents flowing into and out of the second battery according to a charging current threshold and a discharging current threshold. The current limiting controller is coupled to the first battery, the second battery and the current limiting circuit. The current limiting controller controls whether the current limiting circuit restricts the magnitudes of the currents flowing into and out of the second battery according to a voltage of the first battery, a voltage of the second battery, a maximum charging current that the second battery is capable of receiving and a maximum discharging current that the second battery is capable of providing.

According to an embodiment of the invention, the second battery includes a battery controller. The battery controller reports the magnitudes of the maximum charging current and the maximum discharging current of the second battery to the current limiting controller.

According to an embodiment of the invention, the current limiting circuit includes a first current limiting unit. The first current limiting unit is coupled between the second battery and the connection terminal, and restricts the magnitude of the current flowing into the second battery not to exceed the charging current threshold during charging of the battery module.

According to an embodiment of the invention, the current limiting controller detects the voltages of the first battery and the second battery, and when the current limiting controller determines the maximum charging current of the second battery is greater than or equal to a rated charging current of the mobile device and the voltage of the second battery is equal to the voltage of the first battery, the current limiting controller bypasses the first current limiting unit in order not to restrict the magnitude of the current flowing into the second battery.

According to an embodiment of the invention, the current limiting circuit includes a second current limiting unit. The second current limiting unit is coupled between the second battery and the connection terminal, and restricts the magnitude of the current flowing out of the second battery not to exceed the discharging current threshold during discharging of the battery module.

According to an embodiment of the invention, the current limiting controller detects the voltages of the first battery and the second battery, and when the current limiting controller determines the maximum discharging current of the second battery is greater than or equal to a maximum input current of the mobile device and the voltage of the second battery is equal to the voltage of the first battery, the current limiting controller bypasses the second current limiting unit in order not to restrict the magnitude of the current flowing out of the second battery.

Based on the above, the battery module is provided in the embodiments of the invention. In the battery module, the second battery for being the auxiliary power source of the mobile device and the first battery for being the primary power source of the mobile device are connected in parallel with each other via the current limiting circuit, and the magnitudes of the currents flowing into or out of the second battery is restricted by the current limiting circuit. Therefore, the battery module is capable of charging/discharging by simultaneously utilizing the first battery and the second battery under the premise that the second battery is not damaged, thereby extending the usage time of the mobile device.

In order to make the aforementioned features and advantages of the invention more comprehensible, embodiments accompanying figures are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the invention.

DESCRIPTION OF THE EMBODIMENTS

Figure 1:
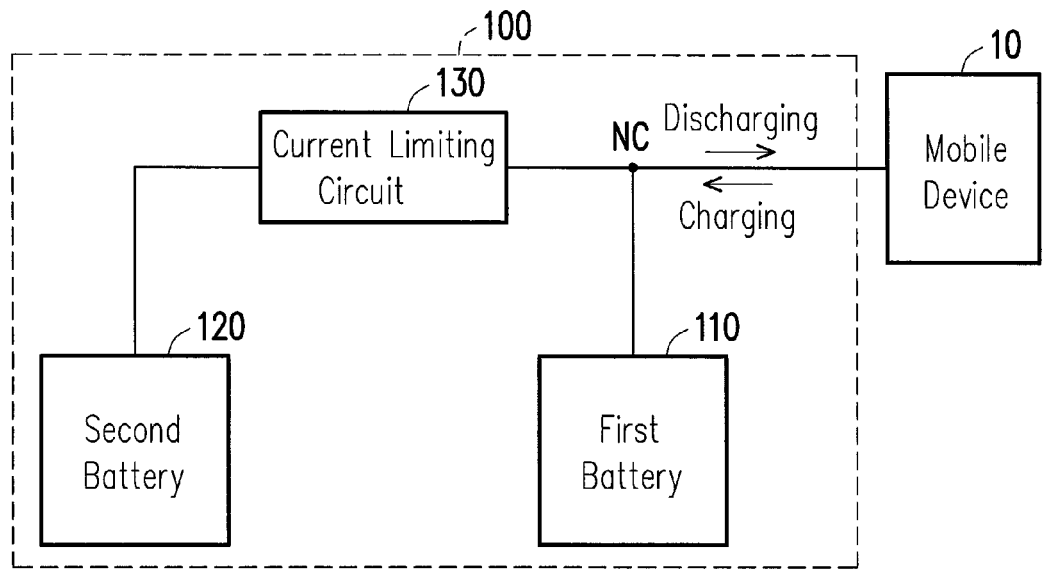
FIG. 1 is a schematic diagram illustrating a battery module according to an embodiment of the invention.

A battery module is provided in the embodiments of the invention. In the battery module, the current magnitude of the second battery for being the auxiliary power source of the mobile device is restricted by the current limiting circuit, so that the battery module is capable of charging/discharging by simultaneously utilizing the first battery being the primary power and the second battery being the auxiliary power under the premise that the second battery is not damaged, thereby extending the usage time of the mobile device. Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram illustrating a battery module according to an embodiment of the invention. Referring to FIG. 1, the battery module 100 includes a connection terminal NC, a first battery 110, a second battery 120 and a current limiting circuit 130. The connection terminal NC can serve as a power input terminal of the battery module 100 during the charging of the battery module 100, so as to receive an external charging current. The charging current can come from a mobile device 10 or an independent charging device (not shown), but the invention is not limited thereto. Moreover, the connection terminal NC can serve as a power output terminal of the battery module 100 during the discharging of the battery module, such that the mobile device 10 can draw the required current for normal operations from the battery module 100. The battery module 100 can be built in the mobile device 10.

The first battery 110 is coupled to the connection terminal NC, and serves as a primary power source of the mobile device 10, wherein the first battery 110 can be a secondary battery having large capacity and high energy density, such as a lithium battery, a nickel cadmium battery or a nickel hydride battery, in order for the mobile device 10 to be used over a long period of time and recharged repeatedly. Herein, the capacity is generally expressed in milliamp-hours (mAh) or amp-hour (Ah), and the energy density can be a weight energy density that is generally expressed in watt-hours/kilogram (W-Hr/kg), or a volumetric energy density that is generally expressed in watt-hours/liter (W-Hr/l). In addition, the mobile device 10 can be a portable electronic device, such as a mobile phone, a personal digital assistant (PDA), a tablet PC or a notebook computer.

The second battery 120 serves as an auxiliary power source of the mobile device 10, wherein the second battery 120 can be a secondary battery having small volume and flexibility, such as a paper battery. As compared with the first battery 110 being the primary power, despite the capacity and energy density of the second battery 120 are lower than that of the first battery 110, the second battery 120 can be disposed in a stray or discrete space within the mobile device 10 due to its low-volume and flexibility so as to serve as the auxiliary power, thereby extending the usage time of the mobile device 10 without adding additional volume to the mobile device 10. In addition, the second battery 120 in FIG. 1 is for illustration purpose. In actual applications, a single paper battery or a plurality of paper batteries connected in parallel with each other can be utilized to implement the second battery 120, but the invention is not limited thereto.

The current limiting circuit 130 is coupled between the second battery 120 and the connection terminal NC. The current limiting circuit 130 restricts the magnitudes of the currents flowing into and out of the second battery 120 according to a charging current threshold and a discharging current threshold, in order to ensure the second battery 120 not to receive or provide an unbearable amount of current that may cause damages during the charging/discharging of the battery module 100. In more details, based on the format of the second battery 120, the charging current threshold and the discharging current threshold can be determined by the designer. In other words, the charging current threshold and the discharging current threshold are not limited to specific numerical values. They can be varied according to the format of the second battery 120.

More specifically, in order to enhance the overall equivalent capacity of the battery module 100, the first battery 110 and the second battery 120 are connected in parallel so as to be coupled to each other. However, since there is a certain degree of difference between the charging/discharging abilities of the first battery 110 and the second battery 120, the second battery 120 with the weaker charging/discharging ability may be damaged resulting from that the battery module 100 receives or provides an excessively large current during charging/discharging.

Therefore, in the embodiment, the second battery 120 and the first battery 110 are connected in parallel with each other via the current limiting circuit 130, wherein the current limiting circuit 130 can respectively restrict the magnitudes of the currents flowing into and out of the second battery 120 not to exceed the charging current threshold and the discharging current threshold during the charging and the discharging of the battery module 100, in order for the second battery 120 to be charged/discharged steadily without receiving or providing an unbearable amount of current. The current limiting circuit 130 can be the related circuit design for restricting current magnitudes, such as a shunt circuit, but the invention is not limited thereto.

It is noted that, the first battery 110 and the second battery 120 in the battery module 100 can be an integrated design in terms of structure, so that the entire battery module 100 can be disposed in a battery accommodating space of the mobile device 10. Moreover, the first battery 110 and the second battery 120 can also be separate designs, so that the first battery 110 is disposed in the battery accommodating space of the mobile device 10 while the second battery 120 is disposed in a discrete space or a stray space of the mobile device 10 (such as inside the housing of the mobile device), but the invention is not limited thereto. In addition, the first battery 110 and the second battery 120 can be built in the mobile device 10, or can be a detachable design for the users to assemble the two batteries to the mobile device 10 by themselves, but the invention is not limited thereto.

Figure 2:
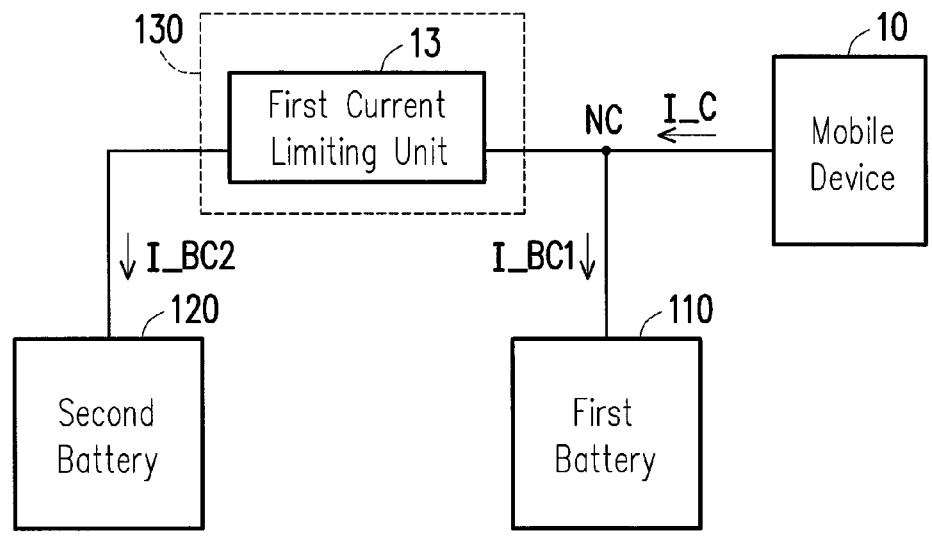
FIG. 2 is a schematic diagram illustrating the battery module depicted in FIG. 1 during charging of the battery module.
Figure 3:
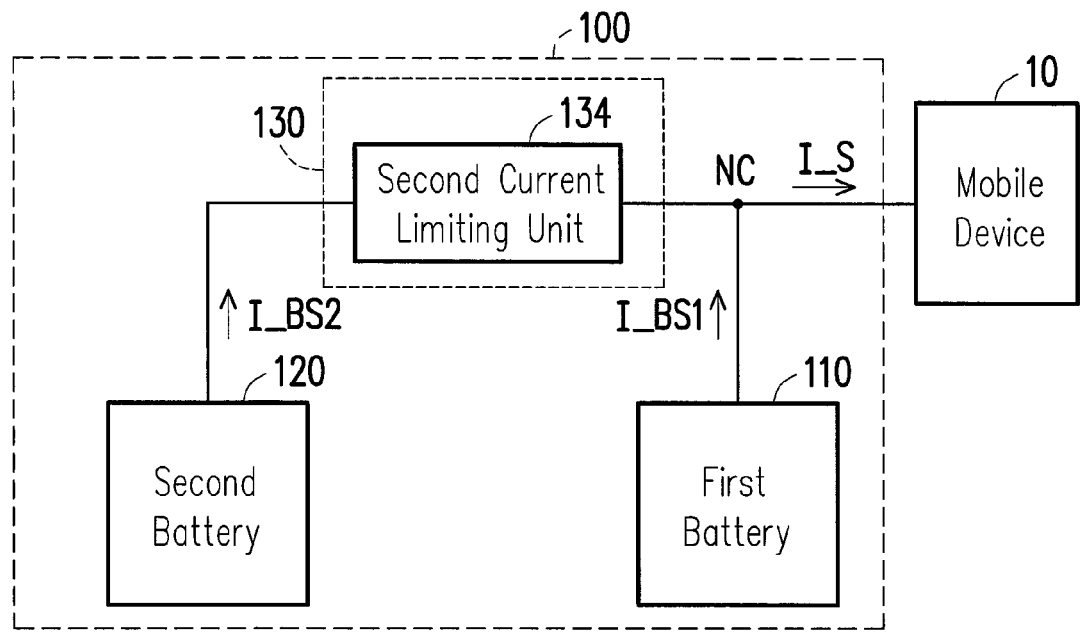
FIG. 3 is a schematic diagram illustrating the battery module depicted in FIG. 1 during discharging of the battery module.

In order to further illustrate the embodiments of the invention, the schematic diagrams for charging and discharging the battery module 100 are respectively shown in FIG. 2 and FIG. 3, wherein FIG. 2 is a schematic diagram illustrating the battery module depicted in FIG. 1 during charging, and FIG. 3 is a schematic diagram illustrating the battery module depicted in FIG. 1 during discharging. In FIG. 2 and FIG. 3, the current limiting circuit 130 includes a first current limiting unit 132 and a second current limiting unit 134, which respectively restrict the magnitudes of the currents flowing into and out of the second battery 120 in response to the actions of charging and discharging. The charging status of the embodiment depicted in FIG. 2 and the discharging status of the embodiment depicted in FIG. 3 are described in the following description, respectively.

Firstly, referring to FIG. 2, when charging the battery module 100, the first current limiting unit 132 is turned on in response to a charging current I_C, and the second current limiting unit (not shown here) is turned off correspondingly, so that the battery module 100 can be equivalent to the configuration as shown in FIG. 2. In the embodiment, the first current limiting unit 132 is coupled between the second battery 120 and the connection terminal NC, and restricts the magnitude of the charging current I_BC2 flowing into the second battery 120 not to exceed the charging current threshold during the charging of the battery module 100 so as to prevent the second battery 120 being damaged. The charging current I_BC1 of the first battery 110 is not restricted. Under the case depicted in FIG. 2, the first battery 110 and the second battery 120 are charged simultaneously.

On the other hand, referring to FIG. 3, when discharging the battery module 100 (that is, supplying power to the mobile device 10), the second current limiting unit 134 is turned on in response to an input current LS of the mobile device 10, and the first current limiting unit (not shown here) is turned off correspondingly, so that the battery module 100 can be equivalent to the configuration as shown in FIG. 3. In the embodiment, the second current limiting unit 134 is coupled between the second battery 120 and the connection terminal NC, and restricts the magnitude of the discharging current I_BS2 flowing out of the second battery 120 not to exceed the discharging current threshold during the discharging of the battery module 100 so as to prevent the second battery 120 being damaged. The discharging current I_BS1 of the first battery 110 is not restricted. Under the case depicted in FIG. 3, the first battery 110 and the second battery 120 supply power to the mobile device 10, simultaneously.

Figure 4:
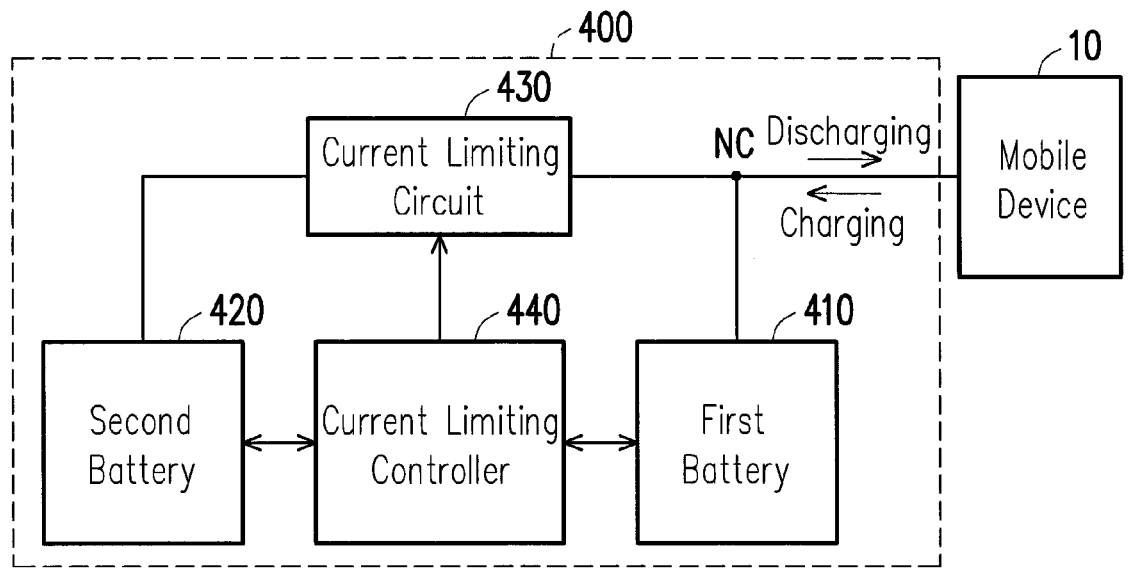
FIG. 4 is a schematic diagram illustrating a battery module according to another embodiment of the invention.

FIG. 4 is a schematic diagram illustrating a battery module according to another embodiment of the invention. Referring to FIG. 4, the battery module 400 includes a connection terminal NC, a first battery 410, a second battery 420, a current limiting circuit 430 and a current limiting controller 440. The connection terminal NC can serve as a power input terminal of the battery module 400 during the charging of the battery module 400, so as to receive a charging current from outside the battery module 400. Moreover, the connection terminal NC can serve as a power output terminal of the battery module 400 during the discharging of the battery module 400, such that the mobile device 10 can draw the required current for normal operations from the battery module 100. The first battery 410, the current limiting circuit 430 and the current limiting controller 440 can be built in the mobile device 10. The second battery 420 can be built in the mobile device 10 or externally connected to the mobile device 10.

The first battery 410 is coupled to the connection terminal NC, and serves as a primary power source of the mobile device 10. The second battery 420 serves as an auxiliary power source of the mobile device 10. The current limiting circuit 430 is coupled between the second battery 420 and the connection terminal NC, wherein the current limiting circuit 430 restricts the magnitudes of the currents flowing into and out of the second battery 420 according to a charging current threshold and a discharging current threshold, in order to ensure the second battery 120 not to receive or provide an unbearable amount of current that may cause damages during charging/discharging.

The current limiting controller 410 is coupled to the first battery 410, the second battery 420 and the current limiting circuit 430. The current limiting controller 440 controls whether the current limiting circuit 430 restricts the magnitudes of the currents flowing into and out of the second battery 420 according to a voltage of the first battery 410, a voltage of the second battery 420, a maximum charging current that the second battery 420 is capable of receiving and a maximum discharging current that the second battery 420 is capable of providing.

In the embodiment, the first battery 410, the second battery 420 and the current limiting circuit 430 of the battery module 400 are substantially the same as the first battery 110, the second battery 120 and the current limiting circuit 130 of the battery module 100 in the embodiment depicted in FIG. 1, and thus a detailed description thereof will be omitted herein. The difference between the battery module 400 and the battery module 100 is that, the battery module 400 can further determine whether the current limiting circuit 430 restricts the magnitudes of the currents flowing into and out of the second battery 420 via the current limiting controller 440.

Figure 5:
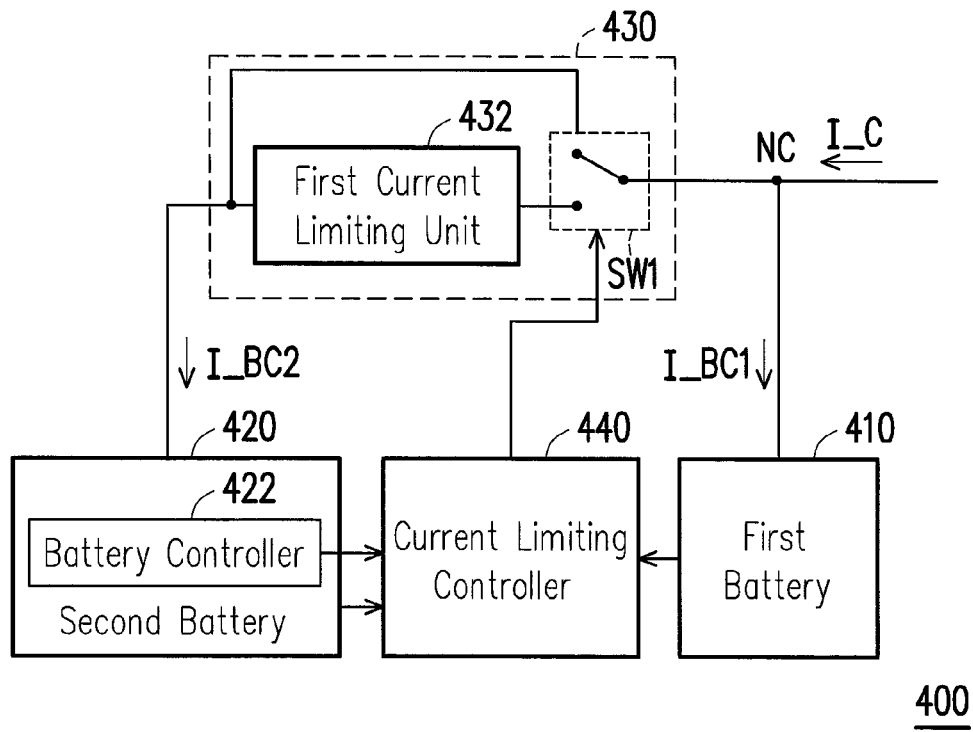
FIG. 5 is a schematic diagram illustrating the battery module depicted in FIG. 4 during charging of the battery module.
Figure 6:
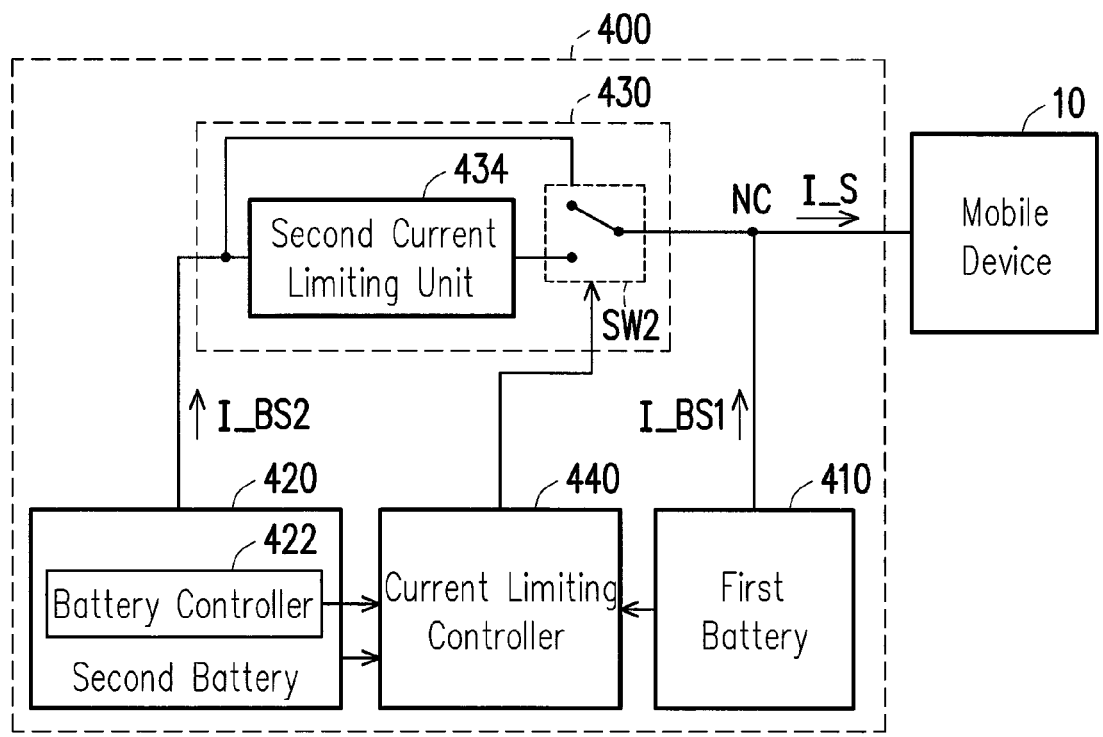
FIG. 6 is a schematic diagram illustrating the battery module depicted in FIG. 4 during discharging of the battery module.

In order to further illustrate the embodiments of the invention, the schematic diagrams for charging and discharging the battery module 400 are respectively shown in FIG. 5 and FIG. 6, wherein FIG. 5 is a schematic diagram illustrating the battery module depicted in FIG. 4 during charging, and FIG. 6 is a schematic diagram illustrating the battery module depicted in FIG. 4 during discharging. In FIG. 5 and FIG. 6, the current limiting circuit 430 includes a first current limiting unit 432 and a second current limiting unit 434, which respectively restrict the magnitudes of the currents flowing into and out of the second battery 420 in response to the actions of charging and discharging. The second battery 420 includes a battery controller 422 that reports the magnitudes of the maximum charging current and the maximum discharging current of the second battery to the current limiting controller 440. The current limiting controller 440 can detect the voltages of the first battery 410 and the second battery 420, so as to be one of the determination conditions for controlling the current limiting circuit 430.

More specifically, in terms of the operation for charging the battery module 400, only under the circumstance that the voltages of the second battery 420 and the first battery 410 are the same and the maximum charging current that the second battery 420 is capable of receiving is greater than or equal to a rated charging current of the mobile device 10, are satisfied concurrently, the current limiting controller 440 will then control the current limiting circuit 430 not to restrict the magnitude of the current flowing into the second battery 420. The requirement for the voltages of the two batteries being the same is because if the first battery 410 and the second battery 420 with different voltages are directly connected in parallel, a large current will be generated due to the voltage difference between the two batteries such that the battery module 400 is damaged. If one of the conditions is not satisfied, the current limiting circuit 430 of the battery module 400 still restricts the magnitude of the current flowing into the second battery 420 not to exceed the charging current threshold, so that the operation for charging the battery module 400 at this moment is similar to the embodiment described in FIG. 2.

On the other hand, referring to FIG. 5, under the circumstance that the current limiting controller 440 determines the voltages of the second battery 420 and the first battery 410 are the same and the maximum charging current that the second battery 420 is capable of receiving is greater than or equal to the rated charging current of the mobile device 10, the current limiting controller 440 bypasses the first current limiting unit 432. At this moment, the charging current I_BC2 of the second battery 420 will not flow through the first current limiting unit 432, so that the magnitude of the current flowing into the second battery 420 is not restricted. Wherein, the function for the current limiting controller 440 to bypass the first current limiting unit 432 can be implemented by the current limiting controller 440 to control the turnings of a switch SW1 in the current limiting circuit 430. However, it is only an implementation of the invention, and the invention is not limited thereto.

Similarly, in terms of the operation for discharging the battery module 400, only under the circumstance that the voltages of the second battery 420 and the first battery 410 are the same and the maximum discharging current that the second battery 420 is capable of providing is greater than or equal to a maximum input current of the mobile device 10, are satisfied concurrently, the current limiting controller 440 will then control the current limiting circuit 430 not to restrict the magnitude of the current flowing out of the second battery 420. If one of the conditions is not satisfied, the current limiting circuit 430 of the battery module 400 still restricts the magnitude of the current flowing out of the second battery 420 not to exceed the discharging current threshold, so that the operation for discharging the battery module 400 at this moment is similar to the embodiment described in FIG. 3.

On the other hand, referring to FIG. 6, under the circumstance that the current limiting controller 440 determines the voltages of the second battery 420 and the first battery 410 are the same and the maximum discharging current that the second battery 420 is capable of providing is greater than or equal to the maximum input current of the mobile device 10, the current limiting controller 440 bypasses the second current limiting unit 434. At this moment, the discharging current I_BS2 of the second battery 420 will not flow through the second current limiting unit 434, so that the magnitude of the current flowing out of the second battery 420 is not restricted. Wherein, similar to the embodiment described above, the function for the current limiting controller 440 to bypass the second current limiting unit 434 can also be implemented by the current limiting controller 440 to control the turnings of a switch SW2 in the current limiting circuit 430. However, it is only an implementation of the invention, and the invention is not limited thereto.

It is noted that, since the magnitudes of the maximum charging current and the maximum discharging current that the second battery 420 are respectively capable of receiving and providing can be the same or different from each other, the current limiting controller 440 of the embodiment is not limited to the configuration for controlling the current limiting circuit 430 simultaneously during charging and discharging. The current limiting controller 440 can include various configurations for controlling the current limiting circuit 430 according to the corresponding charging/discharging conditions, for example, can include four corresponding configurations such as without bypassing the first current limiting unit 432 and the second current limiting unit 434, bypassing one of the first current limiting unit 432 and the second current limiting unit 434, or simultaneously bypassing the first current limiting unit 432 and the second current limiting unit 434.

In summary, the battery module is provided in the embodiments of the invention. In the battery module, the second battery for being the auxiliary power source of the mobile device and the first battery for being the primary power source of the mobile device are connected in parallel with each other via the current limiting circuit, in order for the magnitudes of the currents flowing into or out of the second battery to be restricted by the current limiting circuit. Therefore, the battery module is capable of charging/discharging by simultaneously utilizing the first battery and the second battery under the premise that the second battery is not damaged, thereby extending the usage time of the mobile device. In addition, the battery module including the current limiting controller is further provided in the embodiments of the invention, which can determine whether to restrict the magnitudes of the currents flowing into and out of the second battery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A battery module, comprising:
   a connection terminal, wherein the connection terminal serves as a power input terminal of the battery module during charging of the battery module, and serves as a power output terminal of the battery module during discharging of the battery module;
   a first battery, coupled to the connection terminal, and serving as a primary power source of a mobile device;
   a second battery, serving as an auxiliary power source of the mobile device, wherein an energy density of the first battery is greater than an energy density of the second battery; and
   a current limiting circuit, coupled between the second battery and the connection terminal, and designed according to a format of the second battery for restricting magnitudes of currents flowing into and out of the second battery according to a charging current threshold and a discharging current threshold, wherein
   the current limiting circuit comprises restricting the magnitude of the current flowing into the second battery not to exceed the charging current threshold when the first battery and the second battery are simultaneously charged through the connection terminal; and
   the current limiting circuit comprises restricting the magnitude of the current flowing out of the second battery not to exceed the discharging current threshold when the first battery and the second battery are simultaneously discharged through the connection terminal.

2. The battery module according to claim 1, wherein the first battery and the second battery are connected in parallel with each other.

3. The battery module according to claim 1, wherein the second battery is a paper battery.

4. A battery module, comprising:
   a connection terminal, wherein the connection terminal serves as a power input terminal of the battery module during charging of the battery module, and serves as a power output terminal of the battery module during discharging of the battery module;
   a first battery, coupled to the connection terminal, and serving as a primary power source of a mobile device;
   a second battery, serving as an auxiliary power source of the mobile device, wherein an energy density of the first battery is greater than an energy density of the second battery;
   a current limiting circuit, coupled between the second battery and the connection terminal, and designed according to a format of the second battery for restricting magnitudes of currents flowing into and out of the second battery according to a charging current threshold and a discharging current threshold; and
   a current limiting controller, coupled to the first battery, the second battery and the current limiting circuit, and controlling whether the current limiting circuit restricts the magnitudes of the currents flowing into and out of the second battery according to a voltage of the first battery, a voltage of the second battery, a maximum charging current that the second battery is capable of receiving and a maximum discharging current that the second battery is capable of providing, wherein
   the current limiting circuit comprises restricting the magnitude of the current flowing into the second battery not to exceed the charging current threshold when the first battery and the second battery are simultaneously charged through the connection terminal; and
   the current limiting circuit comprises restricting the magnitude of the current flowing out of the second battery not to exceed the discharging current threshold when the first battery and the second battery are simultaneously discharged through the connection terminal.

5. The battery module according to claim 4, wherein the second battery comprises:
   a battery controller, reporting magnitudes of the maximum charging current and the maximum discharging current of the second battery to the current limiting controller.

6. The battery module according to claim 5, wherein the current limiting controller detects the voltages of the first battery and the second battery, and when the current limiting controller determines the maximum charging current of the second battery is greater than or equal to a rated charging current of the mobile device and the voltage of the second battery is equal to the voltage of the first battery, the current limiting controller bypasses the first current limiting unit in order not to restrict the magnitude of the current flowing into the second battery.

7. The battery module according to claim 5, wherein the current limit controller detects the voltages of the first battery and the second battery, and when the current limiting controller determines the maximum discharging current of the second battery is greater than or equal to a maximum input current of the mobile device and the voltage of the second battery is equal to the voltage of the first battery, the current limiting controller bypasses the second current limiting unit in order not to restrict the magnitude of the current flowing out of the second battery.

8. The battery module according to claim 4, wherein the first battery and the second battery are connected in parallel with each other.

9. The battery module according to claim 4, wherein the second battery is a paper battery.

* * * * *